United States Patent
Yang et al.

(10) Patent No.: US 9,996,065 B2
(45) Date of Patent: Jun. 12, 2018

(54) METHODS AND DEVICES FOR CONTROLLING APPLIANCES

(71) Applicant: Xiaomi Inc., Beijing (CN)

(72) Inventors: Yun Yang, Beijing (CN); Qiao Ren, Beijing (CN); Ziguang Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 482 days.

(21) Appl. No.: 14/698,726

(22) Filed: Apr. 28, 2015

(65) Prior Publication Data

US 2016/0085220 A1    Mar. 24, 2016

Related U.S. Application Data

(63) Continuation of application No. PCT/CN2015/072046, filed on Jan. 30, 2015.

(30) Foreign Application Priority Data

Sep. 23, 2014    (CN) .......................... 2014 1 0492058

(51) Int. Cl.
| | |
|---|---|
| *G05B 15/02* | (2006.01) |
| *H04L 12/28* | (2006.01) |
| *G05B 13/00* | (2006.01) |

(52) U.S. Cl.
CPC .......... *G05B 15/02* (2013.01); *H04L 12/2825* (2013.01)

(58) Field of Classification Search
CPC ............................. G05B 15/02; H04L 12/2825
(Continued)

(56) References Cited

U.S. PATENT DOCUMENTS

| 7,310,344 B1 | 12/2007 | Sue |
|---|---|---|
| 8,090,477 B1 | 1/2012 | Steinberg |

(Continued)

FOREIGN PATENT DOCUMENTS

| CN | 102193525 A | 9/2011 |
|---|---|---|
| CN | 102945027 A | 2/2013 |

(Continued)

OTHER PUBLICATIONS

Office action from Japanese Patent Office for Japanese Application 2016549616, dated Dec. 6, 2016.

(Continued)

*Primary Examiner* — Ryan D. Coyer
(74) *Attorney, Agent, or Firm* — Finnegan, Henderson, Farabow, Garrett & Dunner LLP

(57) ABSTRACT

A method for controlling an appliance is provided. The method includes: receiving a notification message from a control device, wherein the notification message includes address information regarding the control device; receiving quality data of a target object from an appliance configured to process the target object, wherein the quality data of the target object is obtained by measuring quality of the target object by the appliance; and sending an appliance control prompt to the control device according to the address information when determining that the quality data of the target object does not reach a threshold, wherein the appliance control prompt is configured to prompt a user of the control device to start the appliance for processing the target object.

13 Claims, 13 Drawing Sheets

200

(58) Field of Classification Search
USPC .......................................................... 700/275
See application file for complete search history.

(56) References Cited

U.S. PATENT DOCUMENTS

| | | | | |
|---|---|---|---|---|
| 8,620,841 | B1* | 12/2013 | Filson | .................. H04L 12/1895 |
| | | | | 706/12 |
| 2007/0073870 | A1 | 3/2007 | Park et al. | |
| 2011/0231320 | A1* | 9/2011 | Irving | .................... G06Q 30/00 |
| | | | | 705/80 |
| 2012/0089523 | A1* | 4/2012 | Hurri | .................... G06Q 10/10 |
| | | | | 705/304 |
| 2012/0324119 | A1* | 12/2012 | Imes | ..................... F24F 11/006 |
| | | | | 709/227 |
| 2013/0174646 | A1 | 7/2013 | Martin | |
| 2014/0082177 | A1 | 3/2014 | Lemire et al. | |
| 2014/0095164 | A1* | 4/2014 | Sone | ....................... H04L 51/16 |
| | | | | 704/260 |
| 2014/0188287 | A1 | 7/2014 | Sabata | |
| 2014/0266669 | A1 | 9/2014 | Fadell et al. | |
| 2015/0127712 | A1* | 5/2015 | Fadell | .................. G06Q 10/083 |
| | | | | 709/202 |

FOREIGN PATENT DOCUMENTS

| | | | |
|---|---|---|---|
| CN | 103139020 | A | 6/2013 |
| CN | 103149902 | A | 6/2013 |
| CN | 103346938 | A | 10/2013 |
| CN | 103686259 | A | 3/2014 |
| JP | 2004028387 | A | 1/2004 |
| JP | 2012035241 | A | 2/2012 |
| WO | WO 2011/090763 | A2 | 7/2011 |
| WO | WO 2013/113139 | A1 | 8/2013 |
| WO | WO 2014/020879 | A1 | 2/2014 |

OTHER PUBLICATIONS

Office action from Japanese Patent Office for Japanese Application 2016549616, dated May 23, 2017.
Office action from Korean Intellectual Property Office for Korean Application 2015-7012320, dated Jul. 20, 2016.
Office action from Korean Intellectual Property Office for Korean Application 2015-7012320, dated Feb. 6, 2017.
Office action from Mexican Patent Office for Mexican Application 201729693, dated Apr. 25, 2017.
International Search Report and Written Opinions for International Application No. Application No. PCT/CN2015/072046 with English translation, mailed from the State Intellectual Property Office of China dated Jun. 18, 2015.
Extended European Search Report issued in Application No. 15186414.7 from the European Patent Office, dated Apr. 13, 2016.

* cited by examiner

METHODS AND DEVICES FOR CONTROLLING APPLIANCES

CROSS-REFERENCE TO RELATED APPLICATIONS

This application is a continuation of International Application No. PCT/CN2015/072046, filed Jan. 30, 2015, which is based upon and claims priority to Chinese Patent Application No. 201410492058.2, filed Sep. 23, 2014, the entire contents of all of which are incorporated herein by reference.

TECHNICAL FIELD

The present disclosure generally relates to a smart home technology and, more particularly, to methods and devices for controlling an appliance.

BACKGROUND

Conventionally, users of appliances need to turn on the appliances by themselves. For example, a user needs to turn on an air purifier after feeling the air quality at home is poor. However, such user-initiated control not only is inconvenient for the users, but also compromises using effects of the appliances. For example, the user may forget to monitor the environment quality and thus fail to turn on the air purifier.

SUMMARY

According to a first aspect of the present disclosure, there is provided a method for controlling an appliance, the method being used in a server and comprising: receiving a notification message from a control device, wherein the notification message includes address information regarding the control device; receiving quality data of a target object from an appliance configured to process the target object, wherein the quality data of the target object is obtained by measuring quality of the target object by the appliance; and sending an appliance control prompt to the control device according to the address information when determining that the quality data of the target object does not reach a threshold, wherein the appliance control prompt is configured to prompt a user of the control device to start the appliance for processing the target object, According to a second aspect of the present disclosure, there is provided a method for controlling an appliance, the method being used in a control device and comprising: sending to a cloud server a notification message including address information regarding the control device; and receiving appliance control prompt information sent from the cloud server according to the address information, wherein the appliance control prompt information is configured to prompt a user of the control device to start an appliance for processing a target object, and the appliance control prompt information is sent from the cloud server when the cloud server determines that quality data of the target object does not reach a threshold.

According to a third aspect of the present disclosure, there is provided a control device, comprising: a processor; and a memory for storing instructions executable by the processor, wherein the processor is configured to: send a notification message to a cloud server, wherein the notification message includes address information regarding the control device; and receive appliance control prompt information sent from the cloud server, wherein the cloud server sends the appliance control prompt information according to the address information when determining that quality data of a target object does not reach a threshold, and the appliance control prompt information is configured to prompt a user of the control device to start an appliance for processing the target object.

According to a fourth aspect of the present disclosure, there is provided a server, comprising: a processor; and a memory for storing instructions executable by the processor, wherein the processor is configured to: receive a notification message from a control device, wherein the notification message includes address information regarding the control device; receive quality data of a target object from an appliance configured to process the target object, wherein the quality data of the target object is obtained by measuring quality of the target object by the appliance; and send an appliance control prompt to the control device according to the address information when determining that the quality data of the target object does not reach a threshold, wherein the appliance control prompt is configured to prompt a user of the control device to start the appliance for processing the target object.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
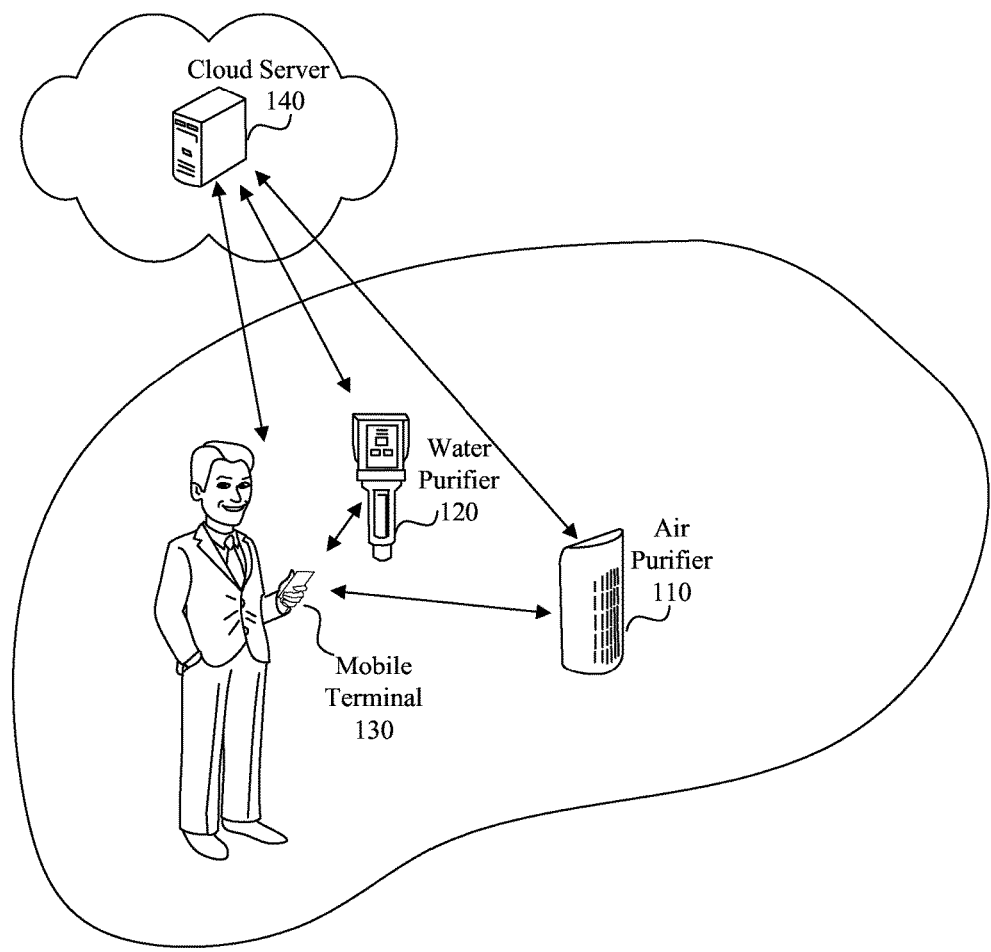
FIG. 1 is a schematic diagram illustrating a system for controlling an appliance, according to an exemplary embodiment.

FIG. 1 is a schematic diagram illustrating a system 100 of controlling one or more appliances, according to exemplary embodiments. Referring to FIG. 1, the system 100 includes a control device, such as a mobile terminal 130, for controlling one or more appliances, and a cloud server 140. For example, the control device is installed with a control application, such as a home control application (APP). Also for example, the appliances may be an air purifier 110, a water purifier 120, etc., and the mobile terminal 130 may be a smart phone. The cloud server 140 may analyze collected measurement data to generate an analysis result, and control the use of the appliances according to the analysis result.

Figure 2:
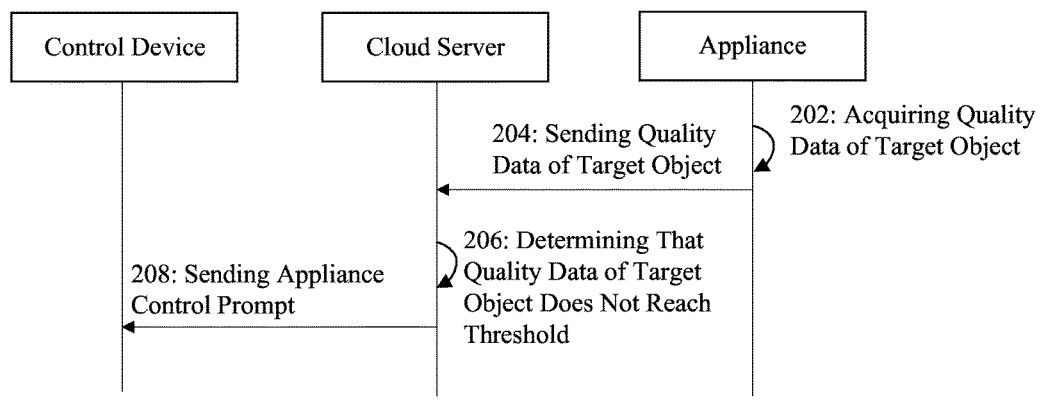
FIG. 2 is a flowchart of a method for controlling an appliance, according to an exemplary embodiment.

FIG. 2 is a flowchart of a method 200 for controlling an appliance, according to an exemplary embodiment. For example, the method 200 may be used in the system 100 (FIG. 1). Referring to FIG. 2, the method 200 includes the following steps.

In step 202, an appliance acquires quality data of a target object.

In exemplary embodiments, the appliance is configured to process the target object. For example, the appliance is the air purifier 110 (FIG. 1) configured to purify air in a user's home, the target object is the air, and the processing is purifying the air. Also for example, the appliance is the water purifier 120 (FIG. 1) configured to filter household water, the target object is the water, and the processing is filtering the water.

In exemplary embodiments, the appliance is configured to measure the target object to obtain quality data of the target object. For example, the air purifier 110 measures air quality in a house to obtain air quality data, and the water purifier 120 measures water quality in the house to obtain water quality data.

In step 204, the appliance sends the quality data of the target object to a cloud server.

In exemplary embodiments, the appliance may periodically report the quality data.

In step 206, the cloud server determines that the quality data of the target object does not reach a threshold.

For example, if the target object is water, the cloud server may pre-store a municipal water quality standard as the threshold, and compare received household water quality data with the threshold. If the target object quality data does not reach the threshold, the cloud server determines that the water quality is poor, and proceeds to step 208. Otherwise, the cloud server does not execute step 208.

In step 208, the cloud server sends an appliance control prompt to a control device, such as the mobile terminal 130 (FIG. 1).

In exemplary embodiments, the cloud server acquires address information regarding the control device from a notification message sent by the control device, and sends the appliance control prompt to the control device according to the address information. For example, the address information may include an address of the home control APP installed on the control device.

In exemplary embodiments, the appliance control prompt is sent to the control device to prompt the user to start the appliance. For example, the appliance control prompt may be "water quality of your house is poor, please enhance filtration level", "water quality of your house is poor, please start water purifier", or the like.

In exemplary embodiments, if the user's house has no appliance for processing the target object, the cloud server determines quality data of the target object in the user's house based on quality data of the target object in the region where the user's house is located. For example, if the house has no water purifier but water quality data reported by other houses in the region is poor, the cloud server may send to the control device an appliance control prompt such as "water quality in the region where your house is located is poor, please install water purifier."

In the present embodiment, the cloud server may prompt the user to start the appliances, thus facilitating the effective use of appliances.

In exemplary embodiments, the control device is installed with a home control APP. When the user starts the home control APP, a house identifier (ID) of the house is generated automatically. The house ID may be a random character string, e.g., "0111qjy." After being generated, the house ID is stored in the control device, and subsequently may be carried in every message the control device sends to the cloud server.

Furthermore, the control device has corresponding address information, e.g., the address of the home control APP installed on the control device, such that the cloud server may send a message to the control device according to the address information. The user may set two or more accounts for the appliance control APP, and all the accounts may correspond to the same address. The home control APP also has an identifier, i.e., a name of the APP, to distinguish from other home control APPs. In some exemplary embodiments, the APP identifier and the address information may be the same.

In exemplary embodiments, the control device sends a notification message to the cloud server. The notification message may include some or all of the above described information items. The cloud server records corresponding relations among the information items. Table 1 illustrates a manner of recording all the related information items.

TABLE 1

Home Control Information Correspondence Table

| House ID | GPS Location Information | APP Identifier | Appliance Information of Appliances | |
|---|---|---|---|---|
| | | | Appliance Type | Appliance Identifier |
| House A (0111qjy) | | yy01 | | |
| | | yy02 | | |
| | | yy03 | | |
| House B | | | | |

Table 1 includes various information items. In the illustrated example, Table 1 includes two houses with similar information recording structures. Only the information recording structure of house A is shown in detail.

Referring to Table 1, house A has a house ID, "0111qjy." In the illustrated embodiment, there are three residents living in house A. Besides identified by the house ID, the home control APP used by each of the three residents also carries an APP identifier, namely, "yy01," "yy02," and "yy03." Before recording any appliance in house A, the cloud server will first record a corresponding relation between the house ID of house A and the APP identifier of each resident.

When, e.g., a water purifier and two air purifiers are installed in house A, the control device may perform an appliance discovery of these appliances. For example, the control device may detect a signal from each appliance.

Alternatively, the control device may send an appliance discovery request to an appliance. The appliance returns a discovery response to the control device after receiving the appliance discovery request, such that the control device may know the existence of the appliance and thus the communication connection between the control device and the appliance is established.

The appliance may send appliance information to the control device. The appliance information may include an appliance type and an appliance identifier of the appliance. The appliance type may be, for example, "water purifier", or "air purifier". Further, for example, "water purifier" may be denoted as "01", and "air purifier" may be denoted as "02". The appliance identifier is used to distinguish individual appliances. For example, when two air purifiers are used in a house and the appliance types of the two air purifiers are identical, the two air purifiers may be distinguished from each other by their appliance identifiers. The appliance identifiers of the two air purifier may be "aa" and "bb," respectively. The appliances send both the appliance identifiers and the appliance types to the control device.

The notification message sent from the control device to the cloud server may include the following information items: address information of the control device, a house ID of the house, an appliance type of an appliance in the house, and an appliance identifier of the appliance. The cloud server records a corresponding relation among these information items, as shown in Table 2.

TABLE 2

Home Control Information Correspondence Table

| House ID | GPS Location Information | APP Identifier | Appliance Information of Appliances | |
|---|---|---|---|---|
| | | | Appliance Type | Appliance Identifier |
| House A (0111qjy) | | yy01 | | |
| | | yy02 | Water Purifier (01) | cc |
| | | yy03 | Air Purifier (02) | aa |
| | | | | bb |
| House B | | | | |

Referring to Table 2, among the recorded information items regarding house A, there are three home control APPs, i.e., yy01, yy02, and yy03. And there are two types of appliances, including a water purifier cc, and two air purifiers aa and bb.

When there are three home control APPs associated with a house, the house IDs generated by the three APPs may be different. The house IDs may further be merged. Specifically, taking the three APPs shown in Table 2 as an example, the Apps "yy01," "yy02," and "yy03" may generate and report to the cloud server house IDs of "0111qjy," "0112qjy," and "0113qjy," respectively. If the three residents intend to inform the cloud server that they actually live in the same house, the resident using the APP "yy01" may operate his or her control device, for example, click an option "house ID merging" on the APP, to perform a merging operation.

Figure 3:
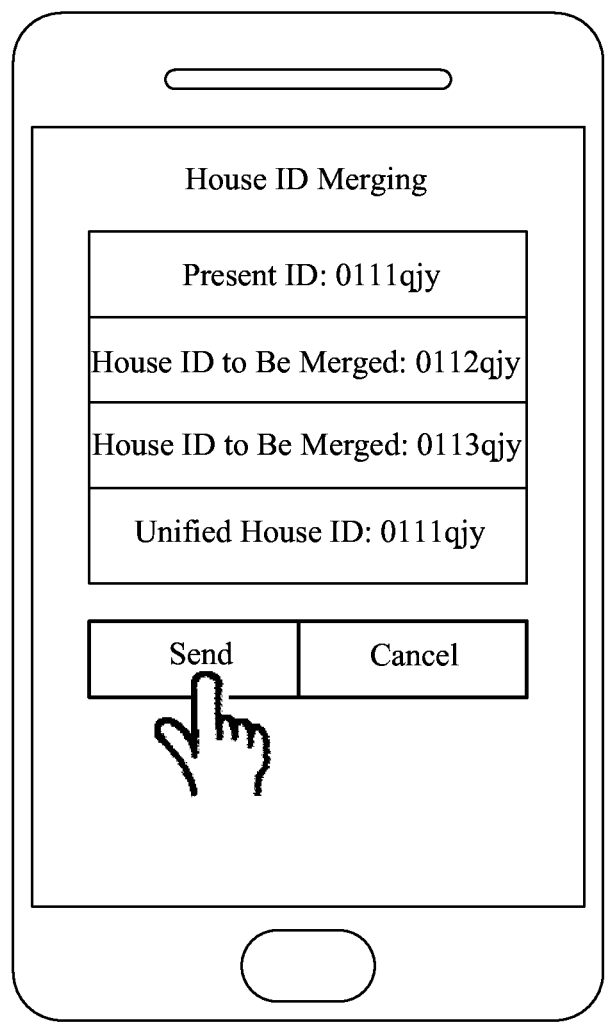
FIG. 3 is a schematic diagram illustrating an operation interface for house ID merging, according to an exemplary embodiment.

FIG. 3 is a schematic diagram illustrating an operation interface 300 for house ID merging, according to an exemplary embodiment. Referring to FIG. 3, the other two residents notify the resident using the APP "yy01" of the house IDs of their respective APPs. The resident using the APP "yy01" inputs the house IDs of the other two residents into boxes for house IDs to be merged. Moreover, the resident selects one of the individual house identifiers as a unified house identifier, for example, "0111qjy" as the unified house identifier. The unified house identifier may be input by the user, or may be selected using a selection marker by, for example, drawing a check mark after "0111qjy". After the unified house identifier is determined, the above information is sent to the cloud server.

After receiving the above information, the cloud server performs the merging operation on the house IDs, so as to unify the house IDs of the three APPs to be 0111qjy, i.e., the three APPs correspond to house A.

Figure 4:
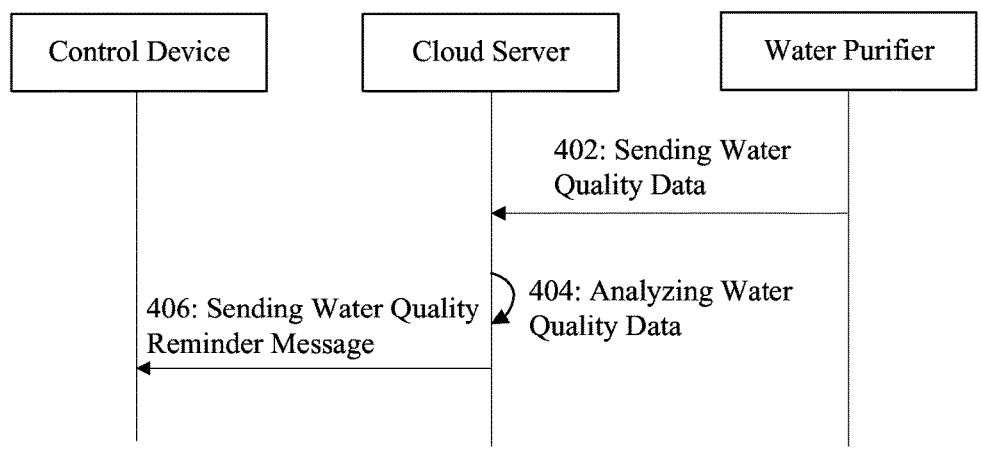
FIG. 4 is a flowchart of a method for controlling an appliance, according to an exemplary embodiment.

FIG. 4 is a flowchart of a method 400 for controlling an appliance, according to an exemplary embodiment. For example, the appliance is a water purifier. Referring to FIG. 4, the method 400 includes the following steps.

In step 402, the water purifier sends water quality data to a cloud server.

In exemplary embodiments, a message sent from the water purifier to the cloud server not only includes the water quality data, but also includes an appliance type and an appliance identifier of the water purifier. The appliance type and the appliance identifier may be merged into one character string, e.g., "01cc", which includes the appliance type "01" (indicating the appliance is a water purifier) and the appliance identifier "cc".

In step 404, the cloud server analyzes the water quality data.

For example, the cloud server compares the water quality data with a threshold. The cloud server proceeds to execute step 406 if it is determined that the water quality is poor. Otherwise the cloud server does not execute step 406.

In step 406, the cloud server searches for a control device to which the water purifier is bound, and sends a water quality reminder message to the control device.

Figure 5:
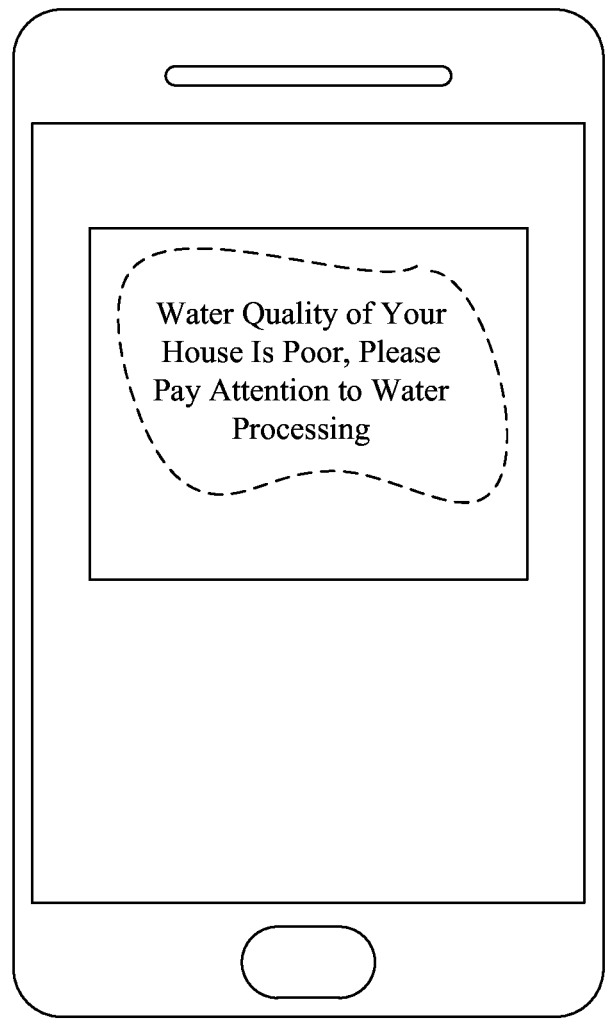
FIG. 5 is a schematic diagram illustrating a control device interface, according to an exemplary embodiment.

In exemplary embodiments, the cloud server may search for the corresponding relations in Table 2 to identify the control device corresponding to the house, and sends a water quality reminder message to the control device according to the address information. For example, FIG. 5 is a schematic diagram illustrating a control device interface 500, according to an exemplary embodiment. Referring to FIG. 5, the control device may be a mobile phone. The mobile phone may display a water reminder message, "water quality of your house is poor, please pay attention to water processing." In this way, the user is reminded that the current water purifier has weak water purification capability and may not purify water thoroughly.

In exemplary embodiments, the notification message reported by the control device to the cloud server further includes geographical location information of a house.

For example, when interacting with an appliance, the control device may sense whether the connection is a remote connection or a local connection. If the connection is a local connection via a local network and thus the control device may be regarded to be in the house, then the APP may start a GPS positioning to acquire GPS geographical location information. Since the house generally occupies a small area, the GPS geographical location information obtained by the GPS positioning may be used as the geographical location information of the house. Moreover, the geographical location information of the house measured by multiple control devices corresponding to the house may be considered substantially identical.

The control device sends to the cloud server the geographical location information. Taking the above house A as an example, the cloud server fills the GPS geographical location information (not shown in Table 2) reported by the APP "yy01" in a cell of GPS location information corresponding to house A in Table 2.

After adding the geographical location information of the house, the cloud server may analyze quality data of the target object in multiple manners. Specifically, take the Table 3 as an example, the analysis on quality data of the target object may be illustrated as follows.

TABLE 3

Home Control Information Corresponding Table

| House ID | GPS Location Information | APP Identifier | Appliance Information of Appliance | | Target Object Quality Data |
|---|---|---|---|---|---|
| | | | Appliance Type | Appliance Identifier | |
| House A (0111qjy) | Beijing, Haidian | yy01 | Water Purifier (01) | cc | *** |
| | | | Air Purifier (02) | aa | *** |
| House B | Chaoyang, Beijing | zz01 | Water Purifier (01) | dd | *** |
| House C | Haidian, Beijing | zy02 | Water Purifier (01) | ee | *** |
| House D | Haidian, Beijing | zy03 | Water Purifier (01) | ff | *** |
| House E | Haidian, Beijing | Yy06 | | | |

Referring to Table 3, the geographical location information reported by the control device may be longitude and latitude information of the house. The cloud server may convert the longitude and latitude information to an actual map region. For example, it may be determined that house A is located in Haidian district, Beijing, and house B is located in Chaoyang district, Beijing. Each house has target object quality data reported by the corresponding control devices.

To analyze water quality data, the cloud server selects water quality data from the same region. For example, the cloud server identifies houses (including house A, house C, and house D) in a specified region such as Haidian district, Beijing, according to the GPS location information in Table 3. Then, the cloud server selects data of water purifiers in these houses. Specifically, according to the appliance type "01," the cloud server selects water quality data from the water purifiers. The cloud server may calculate regional water quality data according to the water quality data, for example, by averaging the data from the identified houses.

When determining that the average water quality of this region does not reach a predetermined water quality threshold, the cloud server may send a water quality reminder message such as "the water quality of this region is poor" to users in this region, for example, to the APP "zy02" of house C and the APP "zy03" of house D.

Furthermore, the cloud server may send a water quality reminder to a house in the same region that has no water purifier. For example, referring to Table 3, the geographical location information on house E indicates house E is located in Haidian district, Beijing. However, there is neither appliance type nor appliance identifier corresponding to house E, which indicates no appliance is installed in house E. This is because if an appliance is installed in house E, the APP "Yy06" of house E will perform an appliance discovery and report appliance information. The cloud server may send an appliance control prompt to the control device corresponding to house E. The appliance control prompt is configured to prompt a user in house E to install an appliance. The prompt may also be configured to update an object quality, for example, to remind the user that the water quality of a region where his or her house is located is poor and the user needs to pay attention to water pollution.

Similarly, the cloud server may also determine air quality of a region according to air quality data reported by air purifiers in the region. The cloud server finds a user in the region who uses no air purifier, and sends a reminder message to the user to remind the user of low air quality. The user may start to install an air purifier in the house after seeing the reminder.

Furthermore, the appliance may also report an appliance state (e.g., a turn-on state or a turn-off state) to the cloud server. In this way, if the cloud server determines that the air quality of a region is poor and finds that an air purifier is installed in a house in the region but is in a turn-off state, then the cloud server may send a reminder notice to an control device corresponding to the house to remind a user of the house to turn on the air purifier.

In the above embodiments, the cloud server sends a notice to the control device to remind the user to start an appliance or to obtain an appliance. In this embodiment, the cloud server may control the appliance directly. For example, the clod server may start the appliance.

For example, when determining that the regional air quality of Haidian district, Beijing is poor, the cloud server may directly send an appliance control instruction to the air purifier of house A in Table 3. The appliance control instruction is configured to turn on the air purifier. Additionally, the cloud server may send a notification message to the control device, such that the user may know that the air purifier has been turned on.

Also for example, to meet energy saving requirements, it may be best to turn on the air purifier when the user is in the house. The cloud server may first determine whether the user is in the house before sending a start instruction. If the user is in the house, the cloud server sends the start instruction to the control device. Specifically, the cloud server may send a positioning request to the control device to request that the control device start a positioning function. Then the control device starts the positioning function to acquire GPS location information and reports the GPS location information to the cloud server. If the received GPS location information coincides with pre-stored geographical location information corresponding to the house, the cloud server determines that the user is in the house.

For another example, if the user does not want that an appliance to be directly controlled by the cloud server, options may be provided for the user. Specifically, before starting the appliance, the cloud server may first send to the control device a notification message, e.g., "current air quality is poor, please indicate whether to allow the cloud server to start the air purifier automatically". If the user is not in the house but intends to start the air purifier, the user may agree to allow the cloud server to start the air purifier. If the user does not agree, the cloud server will not send a start instruction to the air purifier. Moreover, the cloud server may also allow the user to close an appliance controlling function of the cloud server. For example, the user may send a message to the cloud server using the control device, to instruct the cloud server to stop controlling the appliance.

Figure 6:
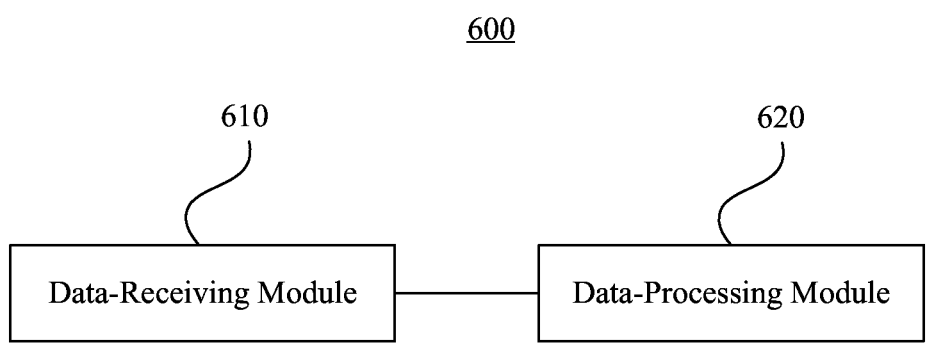
FIG. 6 is a block diagram of a cloud server, according to an exemplary embodiment.

FIG. 6 is a block diagram of a cloud server 600, according to an exemplary embodiment. Referring to FIG. 6, the cloud server 600 includes a data-receiving module 610 and a data-processing module 620.

The data-receiving module 610 is configured to receive from a control device a notification message including address information regarding the control device, and to receive quality data of a target object from an appliance configured to process the target object. The appliance measures quality of the target object to obtain the quality data.

In exemplary embodiments, the notification message further includes at least one of the following information items: a house identifier of a house corresponding to the control device, geographical location information of the house, and an appliance type and an appliance identifier of the appliance.

The data-processing module 620 is configured to send an appliance control prompt to the control device according to the address information when determining that the quality data of the target object does not reach a threshold. The appliance control prompt is configured to prompt a user of the control device to start the appliance for processing the target object.

Figure 7:
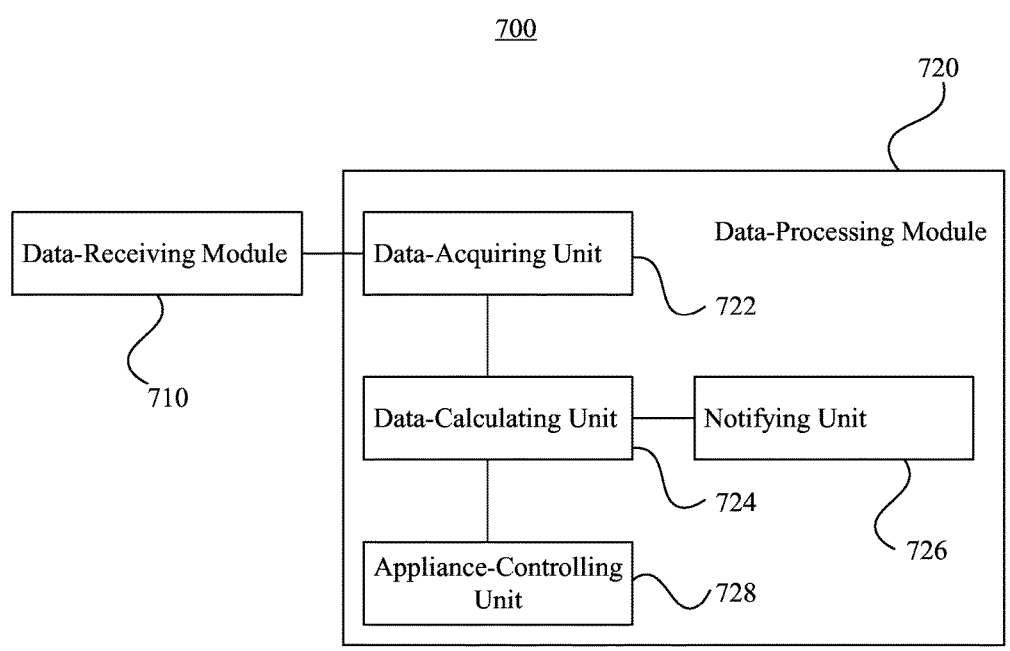
FIG. 7 is a block diagram of a cloud server, according to an exemplary embodiment.

FIG. 7 is a block diagram of a cloud server 700, according to an exemplary embodiment. As shown in FIG. 7, the cloud server 700 includes a data-receiving module 710 and a data-processing module 720, similar to the data-receiving module 610 and the data-processing module 620 (FIG. 6), respectively. The data-processing module 720 further includes a-data acquiring unit 722, a data-calculating unit 724, and a notifying unit 726.

The data-acquiring unit 722 is configured to acquire quality data of the target object from a plurality of appliances. The plurality of appliances have the identical appliance type. The geographical location information of houses corresponding to the plurality of appliances indicates that the houses are in a specified region.

The data-calculating unit 724 is configured to obtain regional quality data of the specified region according to the acquired quality data from the plurality of appliances, and to determine that the regional quality data does not reach the threshold.

The notifying unit 726 is configured to send the appliance control prompt to the control device when the house corresponding to the control device is in the specified region but no apparatus is bound to the control device, and the data calculating unit 724 determines that the regional quality data does not reach the threshold. The appliance control prompt is configured to prompt the user of the control device to add a new appliance for processing the target object.

In exemplary embodiments, the data-processing module 720 may also include an appliance-controlling unit 728 configured to send an appliance control instruction to the appliance, such that the appliance is controlled according to the appliance control instruction.

Figure 8:
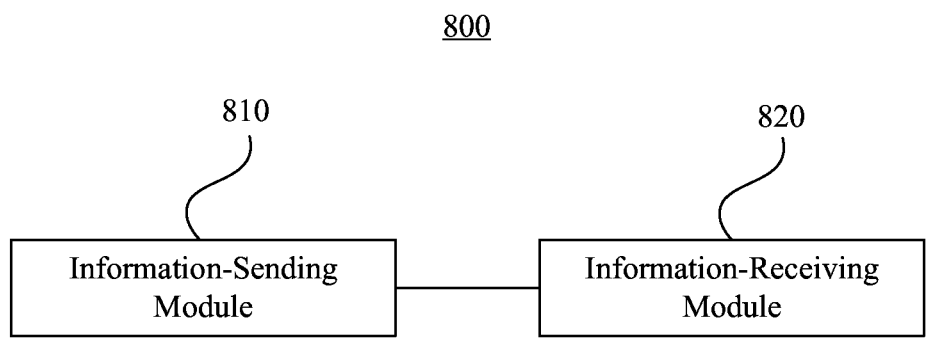
FIG. 8 is a block diagram of a control device, according to an exemplary embodiment.

FIG. 8 is a block diagram of a control device 800, according to an exemplary embodiment. For example, the control device may be a mobile phone installed with a home control APP. Referring to FIG. 8, the control device 800 includes an information-sending module 810 and an information-receiving module 820.

The information-sending module 810 is configured to send to a cloud server a notification message including address information regarding the control device.

The information-receiving module 820 is configured to receive appliance control prompt information sent by the cloud server. The appliance control prompt information is configured to prompt a user of the control device to start an appliance for processing a target object.

Figure 9:
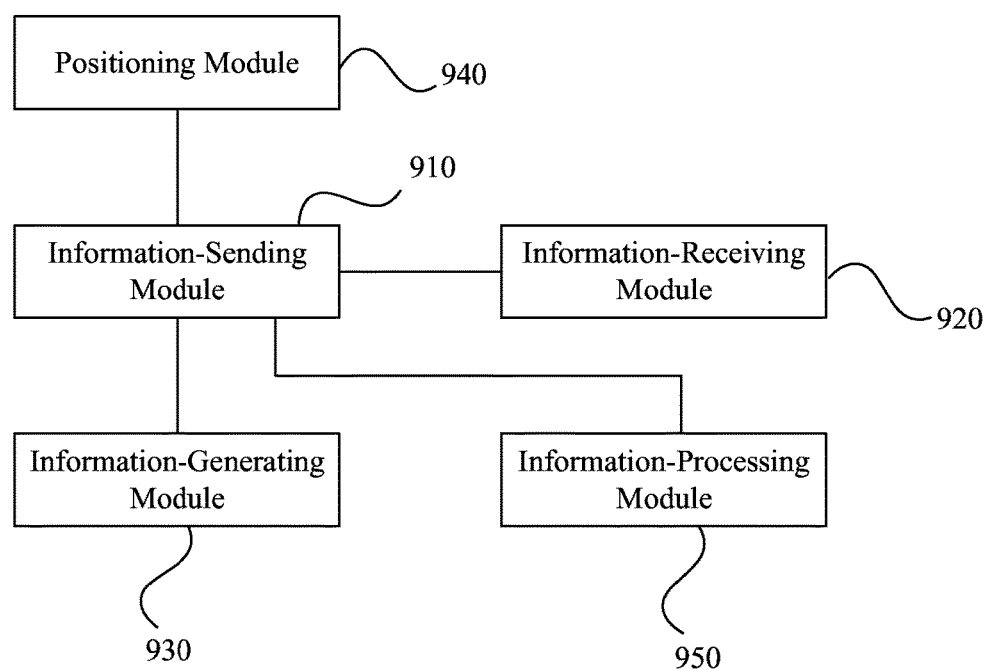
FIG. 9 is a block diagram of a control device, according to an exemplary embodiment.

FIG. 9 is a block diagram of a control device 900, according to an exemplary embodiment. As shown in FIG. 9, the control device 900 includes an information-sending module 910 and an information-receiving module 920, similar to the information-sending module 810 and information-receiving module 820 (FIG. 8), respectively. The control device 900 further includes an information-generating module 930, a positioning module 940, and an information-processing module 950.

The information-generating module 930 is configured to generate a house identifier of a house corresponding to the control device, and to include the house identifier in the notification message, such that the cloud server records a corresponding relation between the individual information items.

The positioning module 940 is configured to acquire geographical location information of the house, and to include the geographical location information in the notification message.

In exemplary embodiments, the information-sending module 910 is further configured to include appliance information and geographical location information of the house in the notification message. The appliance information includes an appliance type of the appliance. The cloud server obtains regional quality data of a specified region where the house is located according to the geographical location information and the appliance type, and sends the appliance control prompt information when the regional quality data does not reach the threshold.

The information-processing module 950 is configured to receive a house identifier merging indicator, to acquire individual house identifiers to be merged according to the house identifier merging indicator, and to use one of the individual house identifiers as a unified house identifier.

In exemplary embodiment, the information-sending module 920 is further configured to send the unified house identifier to the cloud server, such that the cloud server changes the individual house identifiers to the unified house identifier.

Figure 10:
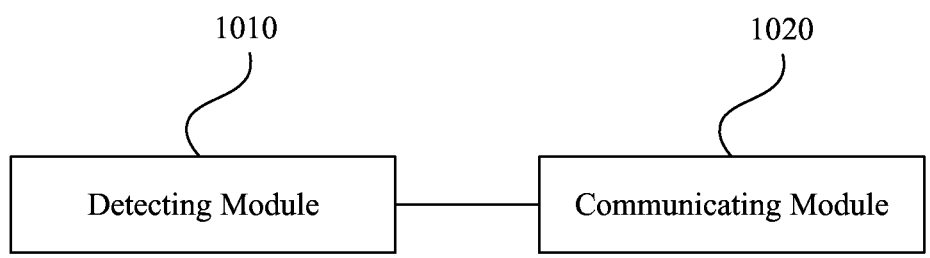
FIG. 10 is a block diagram of an appliance, according to an exemplary embodiment.

FIG. 10 is a block diagram of an appliance 1000, according to an exemplary embodiment. Referring to FIG. 10, the appliance 1000 includes a detecting module 1010 and a communicating module 1020.

The detecting module 1010 is configured to measure quality of a target object to obtain quality data of the target object.

The communicating module 1020 is configured to send the quality data of the target object to a cloud server.

Figure 11:
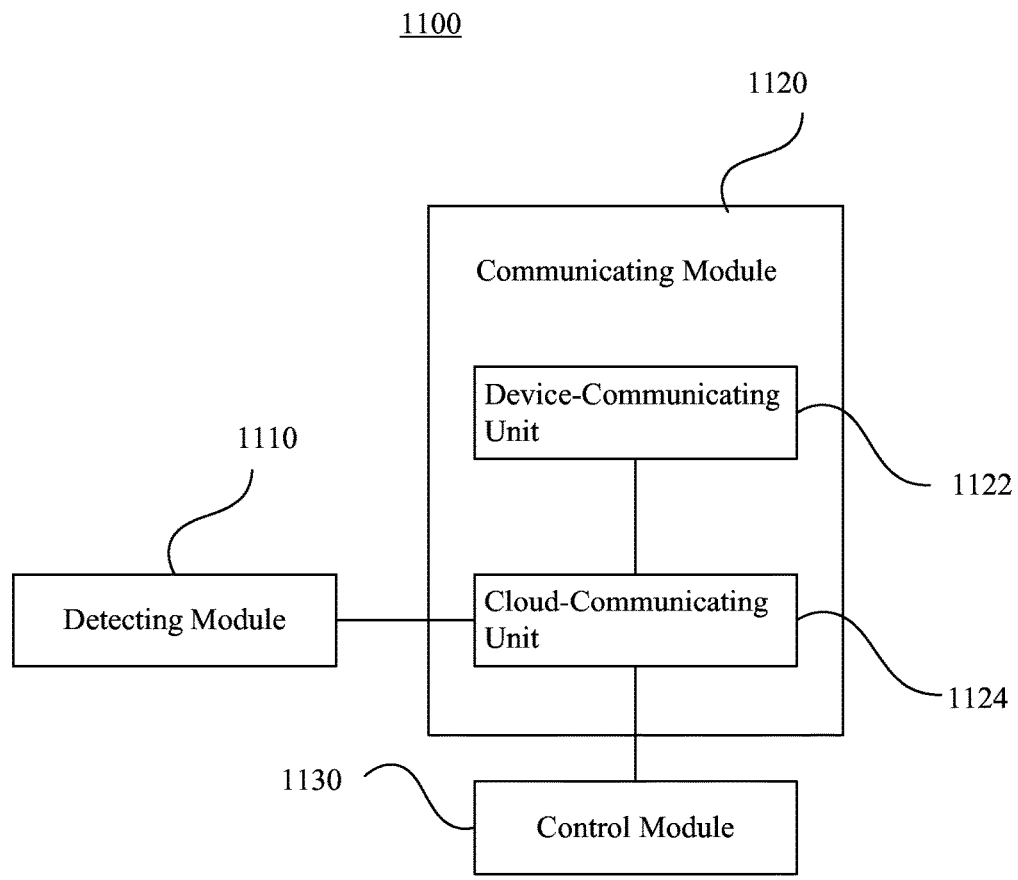
FIG. 11 is a block diagram of an appliance, according to an exemplary embodiment.

FIG. 11 is a block diagram of an appliance 1100, according to an exemplary embodiment. As shown in FIG. 11, the appliance 1100 includes a detecting module 1110 and a communicating module 1120, similar to the detecting module 1010 and communicating module 1020 (FIG. 10), respectively. The communicating module 1120 may further include a device-communicating unit 1122 and a cloud-communicating unit 1124.

The device-communicating unit 1122 is configured to send appliance information including an appliance type and an appliance identifier of the appliance to the control device.

The cloud-communicating unit 1124 is configured to receive an appliance control instruction from the cloud server.

In exemplary embodiments, the appliance 1100 further includes a control module 1130 configured to control the appliance according to the appliance control instruction.

Figure 12:
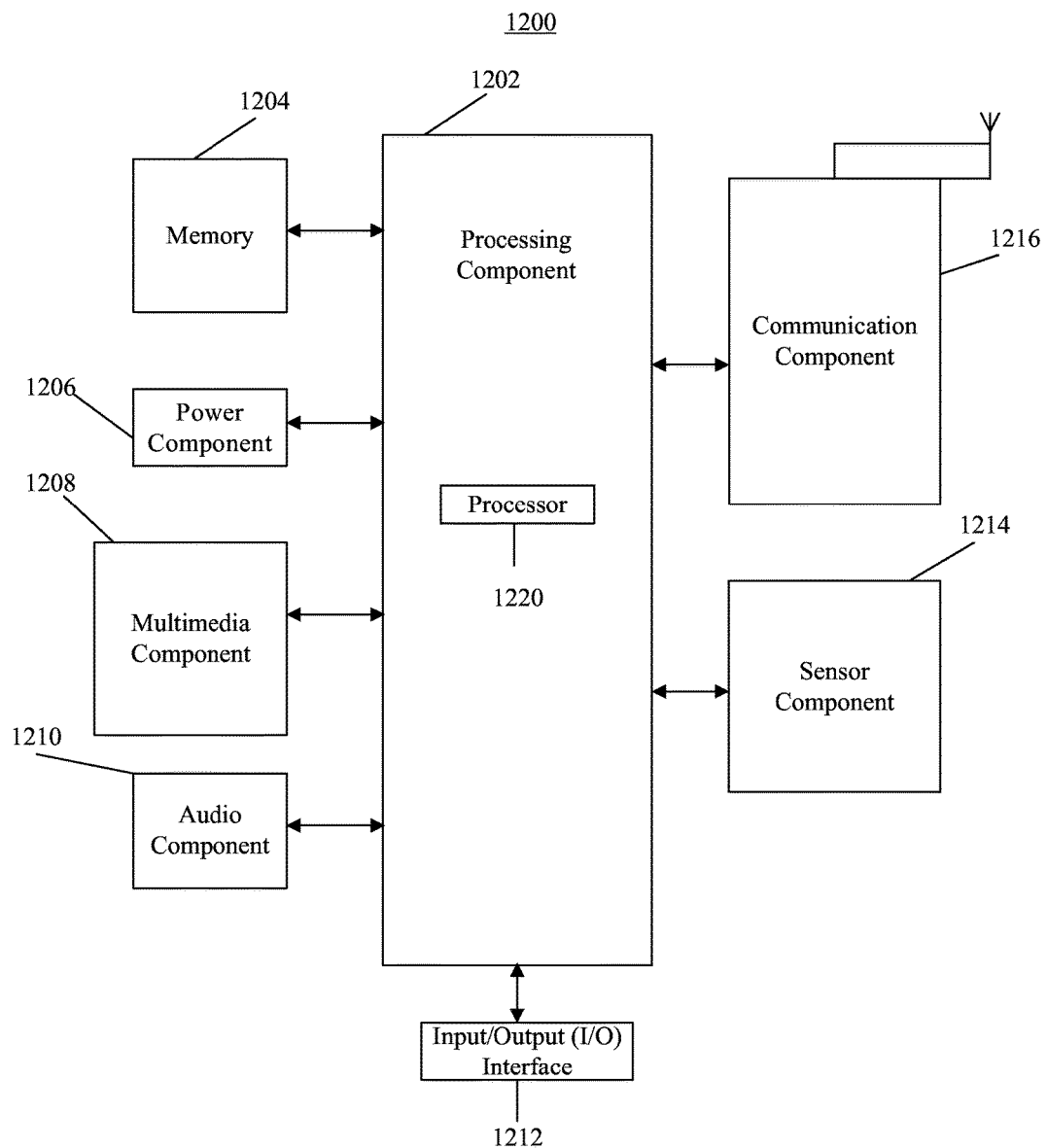
FIG. 12 is a block diagram of a control device, according to an exemplary embodiment.

FIG. 12 is a block diagram of a control device 1200, according to an exemplary embodiment. For example, the control device 1200 may be a mobile phone, a computer, a digital broadcast terminal, a message transceiver, a game console, a tablet, a medical device, an exercise equipment, a personal digital assistant, and the like.

Referring to FIG. 12, the control device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the control device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the control device 1200. Examples of such data include instructions for any applications or methods operated on the control device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the control device 1200. The power component 1206 may include a power management system, one or more power sources, and any other components associated with the generation, management, and distribution of power in the control device 1200.

The multimedia component 1208 includes a screen providing an output interface between the control device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 1208 includes a front-facing camera and/or a rear-facing camera. The front-facing camera and/or the rear-facing camera may receive external multimedia data while the control device 1200 is in an operation mode, such as a photographing mode or a video mode. Each of the front-facing camera and the rear-facing camera may be a fixed optical lens system or have focus and optical zoom capability.

The audio component 1210 is configured to output and/or input audio signals. For example, the audio component 1210 includes a microphone configured to receive an external audio signal when the control device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments on various aspects of the control device 1200. For instance, the sensor component 1214 may detect an open/closed status of the control device 1200 and relative positioning of components (e.g., the display and the keypad of the control device 1200). The sensor component 1214 may also detect a change in position of the control device 1200 or of a component in the control device 1200, a presence or absence of user contact with the device 1200, an orientation or an acceleration/deceleration of the control device 1200, and a change in temperature of the control device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the control device 1200 and other devices. The control device 1200 can access a wireless network based on a communication standard, such as WiFi, 2G, 3G, or a combination thereof. In one exemplary embodiment, the communication component 1216 receives a broadcast signal or broadcast associated information from an external broadcast management system via a broadcast channel. In another exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the control device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1204, executable by the processor 1220 in the control device 1200, for performing the above described methods. For example, the non-transitory computer-readable storage medium may be a ROM, a random access memory (RAM), a CD-ROM, a magnetic tape, a floppy disc, an optical data storage device, and the like.

Figure 13:
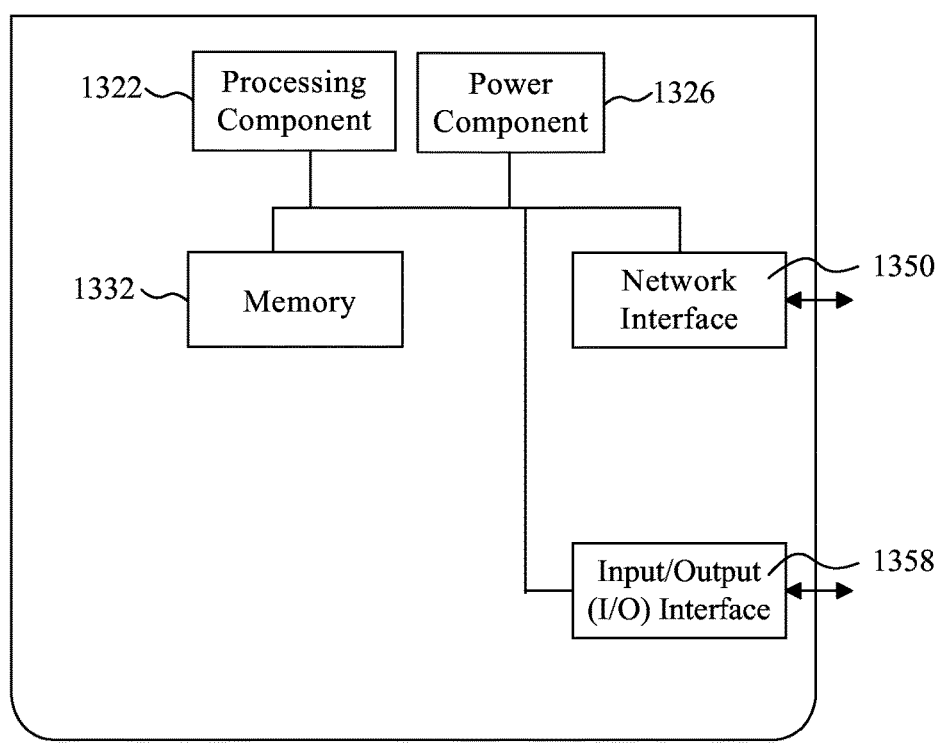
FIG. 13 is a block diagram of a cloud server, according to an exemplary embodiment.

FIG. 13 is a block diagram of a cloud server 1300, according to an exemplary embodiment. Referring to FIG. 13, the cloud server 1300 includes a processing component 1322 including one or more processors, and memory resource represented by a memory 1332 and configured to store instructions (e.g., application programs) executable by the processing component 1322. The application programs stored in the memory 1332 may include one or more modules each corresponding to a set of instructions. The processing component 1322 is configured to execute the instructions to perform the above described methods.

The cloud server 1300 may also include a power supply 1326 configured to perform a power management of the cloud server 1300, a wired or wireless network interface 1350 configured to connect the cloud server 1300 to a network, and an I/O interface 1358. The cloud server 1300 may operate based on an operating system stored in the memory 1332, such as Windows Server™, Mac OS X™, Unix™, Linux™, FreeBSD™, and the like.

In exemplary embodiments, there is also provided a non-transitory computer-readable storage medium storing instructions, such as stored in the memory 1332, executable by the processing component 1322 in the cloud server 1300, for performing the above-described methods. For example, the non-transitory computer-readable storage medium may be a ROM, RAM, a CD-ROM, a magnetic tape, a floppy disc, an optical data storage device, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling an appliance, the method being performed by a server and comprising:
receiving a notification message from a mobile terminal, wherein the notification message includes address information regarding the mobile terminal;
receiving quality data of a target object from an appliance that is remote from the server and configured to process the target object, wherein the quality data of the target object is obtained by measuring quality of the target object by the appliance;
sending an appliance control prompt to the mobile terminal according to the address information when determining that the quality data of the target object does not reach a threshold, wherein the appliance control prompt is configured to cause the mobile terminal to prompt a user to adjust an operation state of the appliance for processing the target object; and
sending an appliance control instruction to the appliance automatically or in response to receiving a user input on the mobile terminal, the appliance control instruction controlling the appliance to adjust the operation state;
wherein when the notification message further includes geographical location information of a house of the user of the mobile terminal, and types of one or more appliances in the house,
the determining that the quality data of the target object does not reach the threshold comprises:
acquiring quality data of the target object from a plurality of appliances based on the geographical location information of the house and the types of the one or more appliances in the house, wherein the plurality of appliances are of identical type and located in a plurality of houses in a specified region;
obtaining regional quality data of the specified region according to the acquired quality data of the target object; and
determining that the regional quality data does not reach the threshold; and
the sending of the appliance control prompt to the mobile terminal according to the address information comprises:
based on a determination that the house of the user is in the specified region and no appliance bound to the mobile terminal processes the target object, sending the appliance control prompt to the mobile terminal when it is determined that the regional quality data does not reach the threshold, wherein the appliance control prompt is configured to cause the mobile terminal to prompt the user to add an appliance for processing the target object.

2. The method of claim 1, wherein the receiving of the quality data of the target object comprises:
receiving the quality data from at least one of an air purifier configured to purify air, or a water purifier configured to purify water.

3. A method for controlling an appliance, the method being performed by a mobile terminal and comprising:
sending to a cloud server a notification message including address information regarding the mobile terminal;
receiving appliance control prompt information from the cloud server, wherein the cloud server sends the appliance control prompt information according to the address information when the cloud server determines that quality data of the target object does not reach a threshold; and
based on the appliance control prompt information, prompting a user to adjust an operation state of an appliance for processing the target object;
wherein the sending of the notification message to the cloud server comprises:
carrying in the notification message appliance information and geographical location information of a house of the user, wherein the appliance information includes an appliance type of the appliance, for the cloud server to obtain regional quality data of a specified region where the house is located according to the geographical location information and the appliance type, and
wherein if the house of the user is in the specified region and no appliance bound to the mobile terminal processes the target object, the method further comprises:
based on the appliance control prompt information, prompting the user to add an appliance for processing the target object, wherein the cloud server sends the appliance control prompt information to the mobile terminal when it is determined that the regional quality data does not reach the threshold.

4. The method of claim 3, further comprising:
receiving a house identifier merging indicator;
acquiring individual house identifiers to be merged according to the house identifier merging indicator;
using one of the individual house identifiers as a unified house identifier; and
sending the unified house identifier to the cloud server, such that the cloud server changes the individual house identifiers to the unified house identifier.

5. The method of claim 3, wherein the appliance:
measures quality of the target object to obtain the quality data; and
sends the quality data of the target object to the cloud server.

6. The method of claim 5, wherein the appliance:
sends appliance information including an appliance type and an appliance identifier of the appliance to the mobile terminal, for the mobile terminal to send the appliance information to the cloud server.

7. A mobile terminal, comprising:
a processor; and
a memory for storing instructions executable by the processor,
wherein the processor is configured to:
send a notification message to a cloud server, wherein the notification message includes address information regarding the mobile terminal;
receive appliance control prompt information from the cloud server, wherein the cloud server sends the appliance control prompt information according to the address information when determining that quality data of a target object does not reach a threshold; and
based on the appliance control prompt information, prompt a user to adjust an operation state of an appliance for processing a target object;
wherein in sending the notification message to the cloud server, the processor is further configured to:
 carry in the notification message appliance information and geographical location information of a house of the user, wherein the appliance information includes an appliance type of the appliance, for the cloud server to obtain regional quality data of a specified region where the house is located according to the geographical location information and the appliance type; and
 based on a determination that the house of the user is in the specified region and no appliance bound to the mobile terminal processes the target object, prompt the user to add an appliance for processing the target object, based on the appliance control prompt information, wherein the cloud server sends the appliance control prompt to the mobile terminal when it is determined that the regional quality data does not reach the threshold.

8. The mobile terminal according to claim 7, wherein the processor is further configured to:
receive a house identifier merging indicator;
acquire individual house identifiers to be merged according to the house identifier merging indicator;
use one of the individual house identifiers as a unified house identifier; and
send the unified house identifier to the cloud server, such that the cloud server changes the individual house identifiers to the unified house identifier.

9. A server, comprising:
a processor; and
a memory for storing instructions executable by the processor,
wherein the processor is configured to:
receive a notification message from a mobile terminal, wherein the notification message includes address information regarding the mobile terminal;
receive quality data of a target object from an appliance that is remote from the server and configured to process the target object, wherein the quality data of the target object is obtained by measuring quality of the target object by the appliance;
send an appliance control prompt to the mobile terminal according to the address information when determining that the quality data of the target object does not reach a threshold, wherein the appliance control prompt is configured to cause the mobile terminal to prompt a user to adjust an operation state of the appliance for processing the target object;
send an appliance control instruction to the appliance automatically or in response to receiving a user input on the mobile terminal, the appliance control instruction controlling the appliance to adjust the operation state;
wherein when the notification message further includes geographical location information of a house of the user of the mobile terminal, and types of one or more appliances in the house, the processor is further configured to:
acquire quality data of the target object from a plurality of appliances based on the geographical location information of the house and the types of the one or more appliances in the house, wherein the plurality of appliances are of identical type and located in a plurality of houses in a specified region;
obtain regional quality data of the specified region according to the quality data of the target object acquired from the plurality of appliances;
determine that the regional quality data does not reach the threshold; and
based on a determination that the house of the user is in the specified region and no appliance bound to the mobile terminal processes the target object, send the appliance control prompt to the mobile terminal when it is determined that the regional quality data does not reach the threshold, wherein the appliance control prompt is configured to cause the mobile terminal to prompt the user to add an appliance for processing the target object.

10. The method of claim 1, wherein the sending of the appliance control prompt to the control device comprises:
receiving, from the appliance, a report indicating that the appliance is in a turn-off state; and
sending the appliance control prompt to the mobile terminal, such that the appliance control prompt causes the mobile terminal to prompt the user to start the appliance for processing the target object.

11. The method of claim 1, wherein the sending of the appliance control instruction to the appliance automatically or in response to receiving a user input on the mobile terminal comprises:
sending a positioning request to the mobile terminal;
receiving, from the mobile terminal, location information of the mobile terminal;

determining whether the location information of the mobile terminal matches a location of the appliance; and in response to a determination that the location information of the mobile terminal matches the location of the appliance, sending the appliance control instruction to the appliance automatically.

12. The server of claim 9, wherein the processor is further configured to:

receive, from the appliance, a report indicating that the appliance is in a turn-off state; and send the appliance control prompt to the mobile terminal, such that the appliance control prompt causes the mobile terminal to prompt the user to start the appliance for processing the target object.

13. The server of claim 9, wherein the processor is further configured to:

send a positioning request to the mobile terminal;

receive, from the mobile terminal, location information of the mobile terminal;

determine whether the location information of the mobile terminal matches a location of the appliance; and in response to a determination that the location information of the mobile terminal matches the location of the appliance, send the appliance control instruction to the appliance automatically.

* * * * *